US 8,167,339 B2

(12) United States Patent
Yagisawa et al.

(10) Patent No.: US 8,167,339 B2
(45) Date of Patent: May 1, 2012

(54) RESIN TUBE-EQUIPPED QUICK CONNECTOR

(75) Inventors: Katsuichi Yagisawa, Saitama (JP); Yasuaki Nagai, Saitama (JP); Kazuhiro Kato, Aichi (JP); Hirokazu Kitamura, Aichi (JP)

(73) Assignees: Tokai Rubber Industries, Ltd., Komaki-Shi (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/583,966

(22) PCT Filed: Dec. 20, 2004

(86) PCT No.: PCT/JP2004/019480
§ 371 (c)(1),
(2), (4) Date: Apr. 20, 2007

(87) PCT Pub. No.: WO2005/061941
PCT Pub. Date: Jul. 7, 2005

(65) Prior Publication Data
US 2007/0200339 A1    Aug. 30, 2007

(30) Foreign Application Priority Data
Dec. 22, 2003  (JP) ................................. 2003-425960

(51) Int. Cl.
*F16L 37/00*  (2006.01)
(52) U.S. Cl. ........................................ 285/305; 285/319
(58) Field of Classification Search .................. 285/305, 285/319
See application file for complete search history.

(56) References Cited

U.S. PATENT DOCUMENTS

| | | | | |
|---|---|---|---|---|
| 4,772,052 A | * | 9/1988 | Morain | 285/305 |
| 4,997,216 A | * | 3/1991 | Washizu | 285/319 |
| 5,152,555 A | * | 10/1992 | Szabo | 285/93 |
| 5,335,944 A | | 8/1994 | Mitsui et al. | |
| 5,542,712 A | * | 8/1996 | Klinger et al. | 285/93 |
| 5,586,792 A | * | 12/1996 | Kalahasthy et al. | 285/319 |
| 6,129,393 A | * | 10/2000 | Kodama et al. | 285/319 |
| 6,145,886 A | * | 11/2000 | Ohta et al. | 285/4 |
| 6,173,998 B1 | * | 1/2001 | Bock | 285/319 |
| 6,409,225 B1 | | 6/2002 | Ito | |
| 6,540,264 B1 | * | 4/2003 | Yokoyama et al. | 285/319 |
| 6,722,703 B2 | * | 4/2004 | Takayanagi | 285/93 |
| 6,805,383 B2 | * | 10/2004 | Ostrander et al. | 285/305 |
| 7,044,505 B2 | * | 5/2006 | Takayanagi | 285/93 |

(Continued)

FOREIGN PATENT DOCUMENTS
EP          0530387 A1    3/1993
(Continued)

*Primary Examiner* — Aaron Dunwoody
(74) *Attorney, Agent, or Firm* — Birch, Stewart, Kolasch & Birch, LLP

(57) ABSTRACT

There is provided a resin tube-equipped quick connector capable of connecting a fuel-transporting resin tube to a mating pipe without hindrance even if the resin tube has a small diameter. The quick connector is constructed such that it includes a connector body having a press-fitting portion, and a retainer. On the other hand, a press-fit undergoing portion of the resin tube into which the press-fitting portion is to be press-fitted is beforehand expanded in tube diameter prior to the press-fitting, and the press-fitting portion is press-fitted into the expanded press-fit undergoing portion in a withdrawal-preventing condition to provide the quick connector equipped with the resin tube.

20 Claims, 10 Drawing Sheets

U.S. PATENT DOCUMENTS

| | | | |
|---|---|---|---|
| 7,108,297 B2 * | 9/2006 | Takayanagi et al. | 285/319 |
| 7,128,347 B2 * | 10/2006 | Kerin | 285/305 |
| 7,497,477 B2 * | 3/2009 | Pepe | 285/93 |
| 7,497,480 B2 * | 3/2009 | Kerin et al. | 285/305 |
| 2002/0084654 A1 * | 7/2002 | Katayama et al. | 285/423 |
| 2002/0140225 A1 * | 10/2002 | Nishiyama et al. | 285/305 |
| 2002/0145285 A1 * | 10/2002 | Katayama et al. | 285/423 |
| 2002/0158465 A1 * | 10/2002 | Tsurumi | 285/93 |

FOREIGN PATENT DOCUMENTS

| | | |
|---|---|---|
| JP | 58 217892 A | 12/1983 |
| JP | 01030765 A | 2/1989 |
| JP | 05-096644 | 4/1993 |
| JP | 06213383 A | 8/1994 |
| JP | 08-326974 A | 12/1996 |
| JP | 11 201355 A | 7/1999 |

* cited by examiner

RESIN TUBE-EQUIPPED QUICK CONNECTOR

BACKGROUND OF THE INVENTION

1. Technical Field

This invention relates to a resin tube-equipped quick connector, and more specifically to a resin tube-equipped quick connector for connecting a fuel-transporting resin tube to a mating pipe.

2. Background Art

A resin tube has heretofore been widely used for fuel transporting purposes, for example, for transporting fuel within a fuel tank to an engine.

This resin tube is connected to a vehicle body-side mating pipe to form a piping system for fuel transporting purposes.

Heretofore, for connecting this resin tube and the mating pipe together, a quick connector capable of effecting this connection with a one-touch operation has been used.

A quick connector of this kind is disclosed, for example, in JP-A-11-201355. FIGS. 8A, 8B, 9A and 9B show a specific example of the construction of this quick connector.

In these Figures, 200 denotes a resin tube, and 202 denotes a mating pipe to which this resin tube 200 is to be connected.

An engagement convex portion (pipe-side engagement portion) 204, projecting in an annular shape, is formed on an outer peripheral surface of the mating pipe 202.

206 denotes the quick connector which includes a connector body (here made entirely of a resin) 208, a retainer 210, and O-rings 212 and a bushing 214 which serve as seal members.

The connector body 208 has a retainer holding portion 216 at one axial side thereof, and also has a press-fitting portion 218 at the other side thereof.

The press-fitting portion 218 is a portion for being press-fitted into the interior of the resin tube 200 in the axial direction, and annular projections 220 of a sawtooth-like cross-section, each having an acute-angled distal end, are formed respectively on a plurality of axially-different portions of an outer peripheral surface of this press-fitting portion.

By press-fitting this press-fitting portion 218 into the interior of the resin tube 200, the connector body 208 is connected to this resin tube 200.

At this time, the annular projections 220, formed on the outer peripheral surface of the press-fitting portion 218, bite into an inner surface of an end portion of the resin tube 200 bulgingly deformed as a result of the pressing fitting, thereby preventing the withdrawal of the resin tube 200.

Incidentally, an annular groove is formed in the press-fitting portion 218, and an O-ring 222 is held in this groove, and this O-ring 222 forms an airtight seal between the press-fitting portion 218 and the resin tube 200.

The retainer holding portion 216 is a portion for receiving the retainer 210 therein to hold the same, and the connector body 208 is connected to the mating pipe 202 through this retainer 210.

A retaining engagement portion (body-side retaining engagement portion) 224 for retaining engagement with the retainer 210 is formed at a front end of this retainer holding portion 216.

On the other hand, the retainer 210 is a resin-made member having a generally annular shape as a whole, and can be elastically deformed radially.

An engagement recess portion (retainer-side engagement portion) 225 with which the engagement convex portion 204 of the mating pipe 202 can be engaged from a radially-inward side, as well as a retaining engagement groove (retainer-side retaining engagement portion) 226 which can be fitted to the retaining engagement portion 224 of the connector body 208 also from the radially-inward side to be retained in the axial direction, is provided on this retainer 210.

This retaining engagement groove 226 is retainingly engaged with the retaining engagement portion 224 of the retainer holding portion 216, so that the retainer 210 is held in a fixed condition in the axial direction by this retainer holding portion 216.

Further, an inner peripheral cam surface 228 and an outer peripheral cam surface 230, each having a tapering shape, are formed respectively on an inner peripheral surface and an outer peripheral surface of this retainer 210.

When the mating pipe 202 is inserted into the interior of the retainer 210 in the axial direction, the inner peripheral cam surface 228 abuts against the engagement convex portion 204 to guide the movement thereof, and also causes the retainer 210 to make an expanding motion elastically as a whole by a cam effect in accordance with the movement of the engagement convex portion 204, thereby allowing the passage of the engagement convex portion 204.

Then, when the engagement convex portion 204 reaches the position of the engagement recess portion 225, the retainer 210 is restored into its original shape as a whole, and simultaneously with this, the engagement convex portion 204 is fitted in the engagement recess portion 225, so that these portions are fixed to each other in the axial direction.

On the other hand, when the retainer 210 is inserted into the retainer holding portion 216 of the connector body 208 in the axial direction, the outer peripheral cam surface 230 abuts against the retaining engagement portion 224 to cause the retainer 210 to make a diameter-reducing motion elastically as a whole, and causes the retaining engagement groove 226 to be retainingly engaged with the retaining engagement portion 224 with this diameter-reducing motion.

Operating finger grips 231 are provided at a front end portion of the retainer 210, and by applying a force to the operating finger grips 231, the retainer 210 can be caused to make a diameter-reducing motion.

In this quick connector 206, the retainer 210 is held in the retainer holding portion 216 of the connector body 208, and in this condition the mating pipe 202 is inserted into the interior of the retainer 210 in the axial direction.

At this time, the retainer 210 is elastically forced open in an expanding direction by the engagement convex portion 204 of the mating pipe 202, and then makes a diameter-reducing motion when the engagement convex portion 204 reaches the engagement recess portion 225, and also the engagement convex portion 204 is engaged in the engagement recess portion 225.

Incidentally, the retainer 210 may be beforehand attached to the mating pipe 202, and in this condition the mating pipe 202 may be inserted, together with the retainer 210, into the connector body 208.

At this time, the retainer 210 once makes a diameter-reducing motion, and thereafter makes an expanding motion when the retaining engagement groove 226 reaches the position of the retaining engagement portion 224, so that the retaining engagement groove 226 is retainingly engaged with the retaining engagement portion 224.

The O-rings 212 and the bushing 214 which serve as the seal members are mounted within the connector body 208 at a region deeper than the retainer holding portion 216, and are held therein. When the mating pipe 202 is inserted into the connector body 208, the O-rings 212 and the bushing 214 are brought into air-tight contact with an insertion end portion 232 of the mating pipe 202, that is, the outer peripheral surface of the insertion end portion 232 disposed closer to the distal end of the mating pipe than the engagement convex portion 204 is disposed, thereby forming an air-tight seal between the mating pipe 202 and the connector body 208.

Although the two O-rings 212 are used in FIG. 8A, there are occasions when only one O-ring 212 is used in order to achieve a compact design as shown in FIG. 8B.

As will be appreciated from the foregoing, in the connection using such quick connector 206, the resin tube 200 can be easily connected to the mating pipe 202 with a one-touch operation.

For example, a tube, having an inner diameter of 6 mm and an outer diameter of about 8 mm, has been used as the above conventional resin tube 200, and it has been used in a piping system as shown in FIG. 10.

In this piping system, fuel within a fuel tank 234 is supplied via a supply passage 238 under a constant pressure by a fuel pump 236, and this fuel is injected from an injector 240 into a cylinder 242 of an engine, and excess fuel is retuned to the fuel tank 234 via a return passage 244.

From the viewpoint of the design of the piping system or from the viewpoint of cost reduction, it is considered preferable that the above pipes and resin tube should be lightweight and small in diameter.

On the other hand, in recent years, there has been used a piping system (a so-called fuel returnless system) in which only a necessary amount of fuel, that is, an amount to be consumed, is supplied to the engine without supplying excess fuel from the fuel tank 234, and the returning of the excess fuel to the fuel tank 234 as in the piping system (a so-called fuel return system) of FIG. 10 is not carried out.

In this fuel returnless system, only the necessary amount of fuel is supplied, and therefore when a resin tube, having the same inner diameter as that of the resin tube of the piping system of FIG. 10, is used, the accumulation of the fuel is liable to occur, and the accumulated fuel is vaporized within the piping by the atmosphere within an engine room, so that an engine speed is liable to become unstable.

In this case, it is preferred to use a small-diameter resin tube with an inner diameter, for example, of not larger than 5 mm as the resin tube so that the accumulation of the fuel will not occur.

With respect to so-called compact vehicles with a small engine displacement, such as a mini-vehicle, an automotive two-wheeled vehicle, an automotive three-wheeled vehicle and an ATV (All Terrain Vehicle), it is preferred to use a small-diameter resin tube with an inner diameter of not larger than 4 mm (for example, 3.5 mm) for the purpose of suppressing the accumulation of fuel, and it is more preferred to use a small-diameter resin tube with an inner diameter of not larger than 3 mm (for example, 2.5 mm).

However, in the case of using such a small-diameter resin tube, when the press-fitting portion 218 of the quick connector 206 is press-fitted directly into the resin tube, this press-fitting operation fails halfway, and when trying to forcibly press-fit it, the resin tube is buckled, so that the resin tube cannot be connected to the mating pipe 202 by the use of such a quick connector 206.

DISCLOSURE OF THE INVENTION

This invention has been made in view of the background of the above circumstances, and its object is to provide a resin tube-equipped quick connector capable of connecting even such a small-diameter resin tube as described above to a mating pipe without hindrance.

According to one aspect of the present invention, there is provided a resin tube-equipped quick connector for connecting a fuel-transporting resin tube to a mating pipe, comprising a connector body, a retainer and a seal member; characterized in that the connector body has a generally tubular shape as a whole, and has a socket-like retainer holding portion at one axial side thereof, and also has at the other side thereof a press-fitting portion which is press-fitted into the interior of the resin tube from one end thereof; the retainer is a member for being held in the retainer holding portion, and is engaged with a convex or concave pipe-side engagement portion, formed on an outer peripheral surface of the mating pipe and spaced from an axial insertion-side end thereof, so as to fix the inserted mating pipe in the axial direction; the seal member is mounted within the connector body at an inner region thereof disposed closer to the press-fitting portion than the retainer holding portion is disposed, and the seal member is brought into contact with an outer peripheral surface of an insertion end portion of the inserted mating pipe disposed closer to the distal end of the mating pipe than the pipe-side engagement portion is disposed, thereby forming an air-tight seal between the insertion end portion and an inner surface of the connector body; and a press-fit undergoing portion of the resin tube into which the press-fitting portion is to be press-fitted is beforehand expanded in tube diameter prior to the press-fitting, and the press-fitting portion is press-fitted in the tube diameter-expanded press-fit undergoing portion to be integrated therewith in a withdrawal-preventing condition.

According to a second aspect of the present invention, the retainer is the member which is elastically deformable radially, and includes a retainer-side retaining engagement portion which can be fitted to a body-side retaining engagement portion, formed at the retainer holding portion of the connector body, from a radially-inward side to be retained and fixed in the axial direction, and at least one of an inner peripheral cam surface for elastically expanding the retainer when inserting the mating pipe into the retainer and an outer peripheral cam surface for elastically reducing the diameter of the retainer when inserting the retainer into the retainer holding portion.

According to a third aspect of the present invention, the resin tube is a small-diameter one having an inner diameter of not larger than 5 mm.

According to a fourth aspect of the invention, a protector is fitted on the resin tube to cover an outer peripheral surface of the resin tube.

According to a fifth aspect of the present invention, the resin tube has such a structure that a plurality of layers are layered together in the radial direction, and the layer on the inner surface of the resin tube is formed by a resin layer which is more excellent in gasoline resistance than the layer on the outside thereof.

As described above, in the present invention, the press-fit undergoing portion of the resin tube, that is, the press-fit undergoing portion into which the press-fitting portion of the connector body is to be press-fitted, is beforehand expanded in tube diameter prior to the press-fitting, and the press-fitting portion is press-fitted into this expanded press-fit undergoing portion in a withdrawal-preventing condition, thus beforehand providing the quick connector equipped with the resin tube. In the present invention, even the small-diameter resin tube can be easily connected to the mating pipe with a one-touch operation.

Here, the retainer is the member which can be elastically deformed radially, and can be constructed to have the retainer-side retaining engagement portion for retaining engagement with the body-side (connector body-side) retaining engagement portion and the inner peripheral cam surface or the outer peripheral cam surface.

The present invention is suitably applied particularly to the connection of the small-diameter resin tube having the inner diameter of not larger than 5 mm.

The protector can be fitted on the resin tube to cover the outer peripheral surface thereof.

By doing so, chipping due to a flying stone can be prevented, and also the resin tube can be prevented from damage when the resin tube is fixed to a predetermined portion of a vehicle body by a clamp.

In the present invention, the resin tube can have such a structure that the plurality of layers are layered together in the radial direction, and the layer on the inner surface of the resin tube can be formed by a resin layer having an excellent gasoline resistance.

With this layered structure of the resin tube, the layer on the inner surface thereof can impart a good gasoline resistance, and besides by providing the high-strength layer on the outside thereof, the strength of the resin tube itself can be increased to a high strength.

BEST MODE FOR CARRYING OUT THE INVENTION

Figure 1:
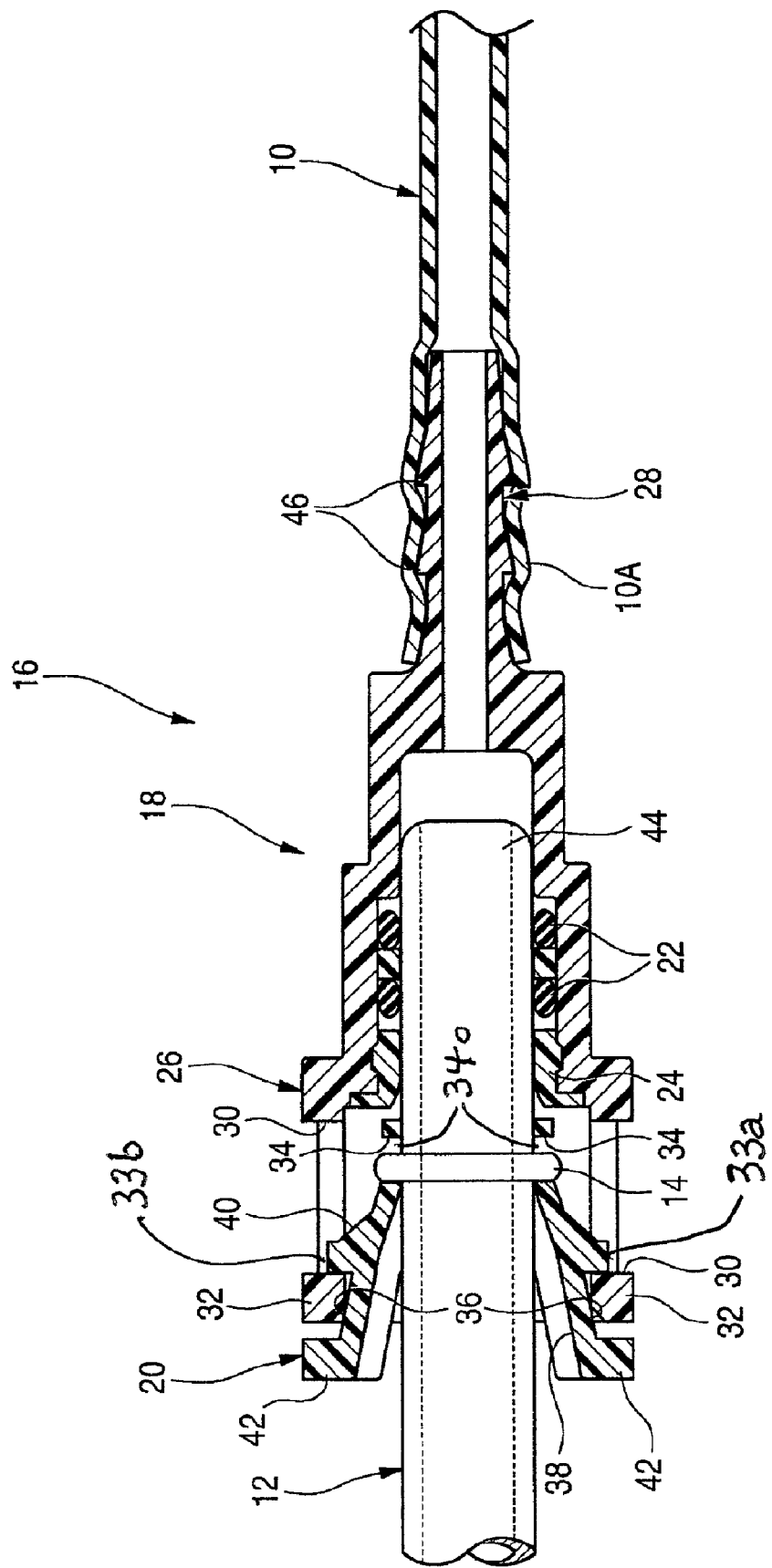
FIG. 1 is a view showing one preferred embodiment of a resin tube-equipped quick connector of the present invention connected to a mating pipe.

Next, an embodiment of the present invention will be described in detail with reference to the drawings.

In FIGS. 1 to 3, 10 denotes a small-diameter resin tube used for transporting fuel, and it is used in a compact vehicle such as e.g. a mini-vehicle and an automotive two-wheeled vehicle, and is suitably used both in a fuel returnless system and a fuel return system in which excess gasoline is returned to a fuel tank.

Here, an inner diameter d1 (see FIG. 4) is 2.5 mm, and an outer diameter d2 is 4 mm.

In the present invention, the compact vehicle means an automotive two-wheeled vehicle, an automotive three-wheeled vehicle, an ATV (All Terrain Vehicle) and the like.

12 denotes a mating pipe (here made of metal) to which the resin tube 10 is to be connected, and an engagement convex portion (pipe-side engagement portion) 14, projecting in an annular shape, is formed on an outer peripheral surface of this mating pipe.

16 denotes the quick connector which includes a connector body (here made entirely of a resin) 18 having a generally tubular shape as a whole, a retainer 20, and O-rings 22 and a bushing 24 which serve as seal members.

In this embodiment, the quick connector 16 (except the seal members) and the resin tube 10 are composed of polyamide.

However, the material for the quick connector 16 and the resin tube 10 is suitably selected from the viewpoints of heat resistance, anti-fuel-penetrability, gasoline resistance (hardly swelling even upon contact with gasoline) and a cost.

Specifically, polyamide series (PA11, PA12, P6, PA66, PPA, etc.,) and PPS are excellent in heat resistance, and polyester series (PBT, PET, PEN, etc.,) are excellent in anti-fuel-penetrability and gasoline resistance.

POM, while securing heat resistance, anti-fuel-penetrability and gasoline resistance, is relatively inexpensive.

The above materials are used as they are, and in other cases it is desirable to add glass fibers in order to enhance the strength or to add a nano-composite material such as clay in order to enhance the anti-fuel-penetrability.

It is desirable that the material for the quick connector 16 be the same as the material for the resin tube 10, and with respect to the material for the resin tube 10, an alloyed elastomer is used in any of the above resin materials (the polyamide series, the polyester series, the POM, etc.,), and by doing so, in addition to the heat resistance and the anti-fuel-penetrability inherent to the resin, flexibility can be imparted to the resin tube 10.

The connector body 18 has a socket-like retainer holding portion 26 at one axial side thereof, and also has a press-fitting portion (nipple portion) 28 at the other side thereof.

The retainer holding portion 26 is a portion for receiving the retainer 20 therein to hold the same, and the connector body 18 is connected to the mating pipe 12 through this retainer 20.

Open box-shaped windows 30 and a front-end retaining engagement portion (body-side retaining engagement portion) 32 for retaining engagement with the retainer 20 are provided on this retainer holding portion 26.

On the other hand, the retainer 20 is a resin-made member having a generally annular shape (here a generally cross-sectionally C-shape) as a whole, and can be elastically deformed radially.

An engagement recess portion (retainer-side engagement portion) 34 having first and second arc-shaped openings (recesses) 34o with which the convex engagement portion 14 of the mating pipe 12 can be engaged from a radially-inward side, as well as a retaining engagement groove (retainer-side retaining engagement portion) 36 which can be fitted to the retaining engagement portion 32 of the connector body 18 also from the radially-inward side to be retained in the axial direction, are provided on this retainer 20.

Figure 2:
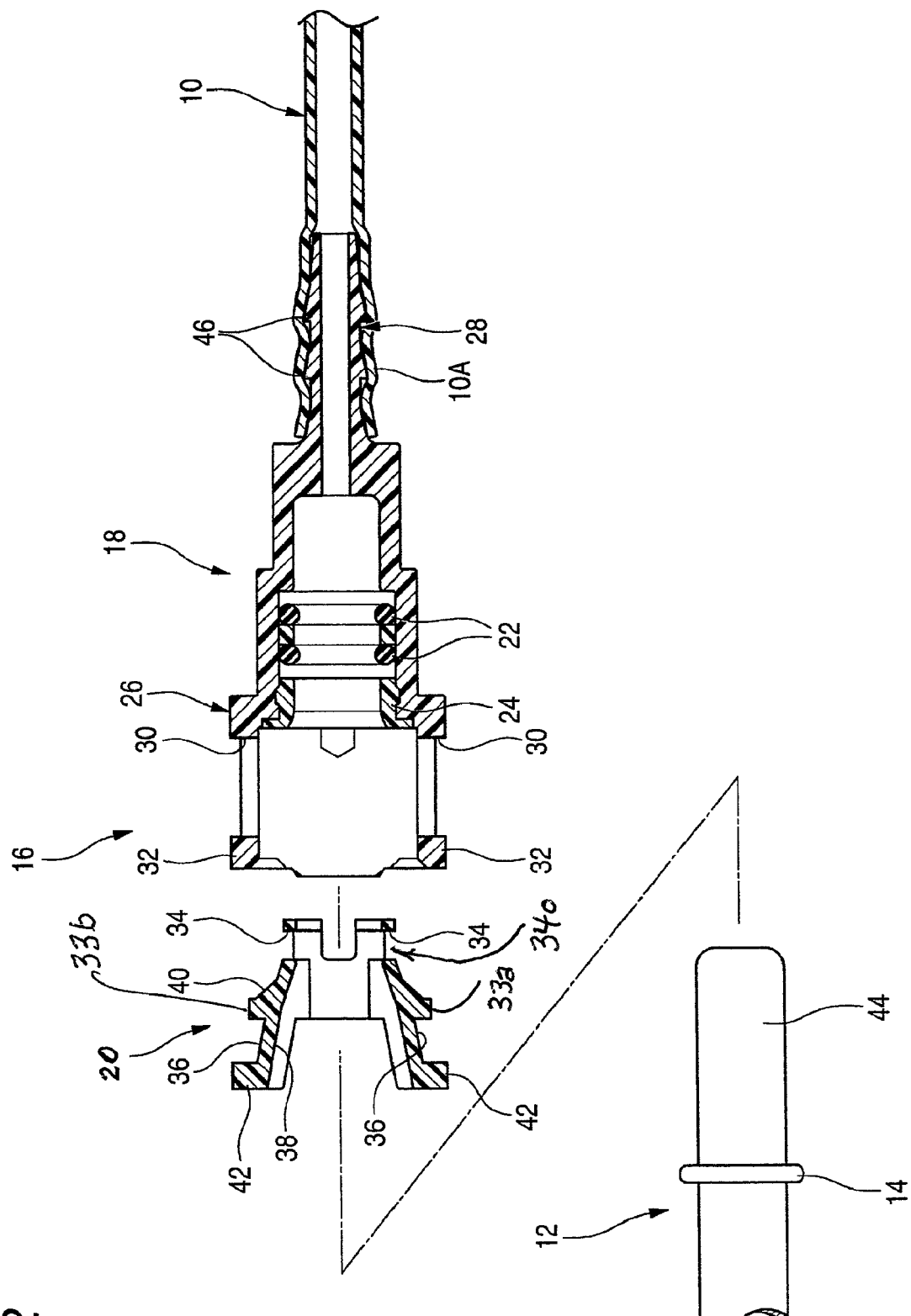
FIG. 2 is a view showing the quick connector of the above embodiment disassembled into a connector body and a retainer, and also showing a condition before the connector is connected to the mating pipe.

This retaining engagement groove 36 is retainingly engaged with the retaining engagement portion 32 of the retainer holding portion 26, so that the retainer 20 is held in a fixed condition in the axial direction by this retainer holding portion 26. In particular, as can be seen in FIG. 2, retainer 20 includes a first arc-shaped portion 33a which projects outwardly into one of the box-shaped windows 30 of the retainer holding portion 26, and a second arc-shaped portion 33*b* which projects outwardly into the other of the box shaped windows 30 of the retainer holding portion 26. As can be seen in FIG. 1, when the mating pipe 12 is fixed in an axial direction in the retainer, and the retainer 20 is held in the connector body 18, the convex engagement portion 14 of the mating pipe 12 and the arc-shaped portions 33*a*, 33*b* are located directly under the box-shaped windows 30 of the retainer holding portion 26, and are visible when viewed through each of the box-shaped windows 30.

Further, an inner peripheral cam surface 38 and an outer peripheral cam surface 40, each having a tapering shape, are formed respectively on an inner peripheral surface and an outer peripheral surface of this retainer 20.

When the mating pipe 12 is inserted into the interior of the retainer 20 in the axial direction, the inner peripheral cam surface 38 abuts against the engagement convex portion 14 to guide the movement thereof, and also causes the retainer 20 to make an expanding motion elastically as a whole by a cam effect in accordance with the movement of the engagement convex portion 14, thereby allowing the passage of the engagement convex portion 14.

Then, when the engagement convex portion 14 reaches the position of the engagement recess portion 34, the retainer 20 is restored into its original shape as a whole, and simultaneously with this, the engagement convex portion 14 is fitted in the engagement recess portion 34, so that these portions are fixed to each other in the axial direction.

On the other hand, when the retainer 20 is inserted into the retainer holding portion 26 of the connector body 18 in the axial direction, the outer peripheral cam surface 40 abuts against the retaining engagement portion 32 to cause the retainer 20 to make a diameter-reducing motion elastically as a whole, and causes the retaining engagement groove 36 to be retainingly engaged with the retaining engagement portion 32 with this diameter-reducing motion.

Operating finger grips 42 are provided at the front end portion of the retainer 20, and by applying a force to the operating finger grips 42, the retainer 20 can be caused to make a diameter-reducing motion.

In this quick connector 16, the retainer 20 is held in the retainer holding portion 26 of the connector body 18, and in this condition the mating pipe 12 is inserted into the interior of the retainer 20 in the axial direction.

At this time, the retainer 20 is elastically forced open in an expanding direction by the engagement convex portion 14 of the mating pipe 12, and then makes a diameter-reducing motion when the engagement convex portion 14 reaches the engagement recess portion 34, and also the engagement convex portion 14 is engaged in the engagement recess portion 34.

Incidentally, the retainer 20 may be beforehand attached to the mating pipe 12, and in this condition the mating pipe 12 may be inserted, together with the retainer 20, into the connector body 18.

At this time, the retainer 20 once makes a diameter-reducing motion, and thereafter makes an expanding motion when the retaining engagement groove 36 reaches the position of the retaining engagement portion 32, so that the retaining engagement groove 36 is retainingly engaged with the retaining engagement portion 32.

The O-rings 22 and the bushing 24 which serve as the seal members are mounted within the connector body 18 at a region deeper than the retainer holding portion 26, and are held therein. When the mating pipe 12 is inserted into the connector body 18, the O-rings 22 and the bushing 24 are brought into air-tight contact with an insertion end portion 44 of the mating pipe 12, that is, the outer peripheral surface of the insertion end portion 44 disposed closer to the distal end of the mating pipe than the engagement convex portion 14 is disposed, thereby forming an air-tight seal between the mating pipe 12 and the connector body 18.

The above press-fitting portion 28 is a portion for being press-fitted into the interior of the resin tube 10 in the axial direction. Annular projections 46 of a sawtooth-like cross-section, each having an acute-angled distal end, are formed respectively on a plurality of axially-different portions of an outer peripheral surface of this press-fitting portion.

By press-fitting this press-fitting portion 28 into the interior of the resin tube 10 from one end thereof, the connector body 18 is connected to this resin tube 10.

Figure 3:
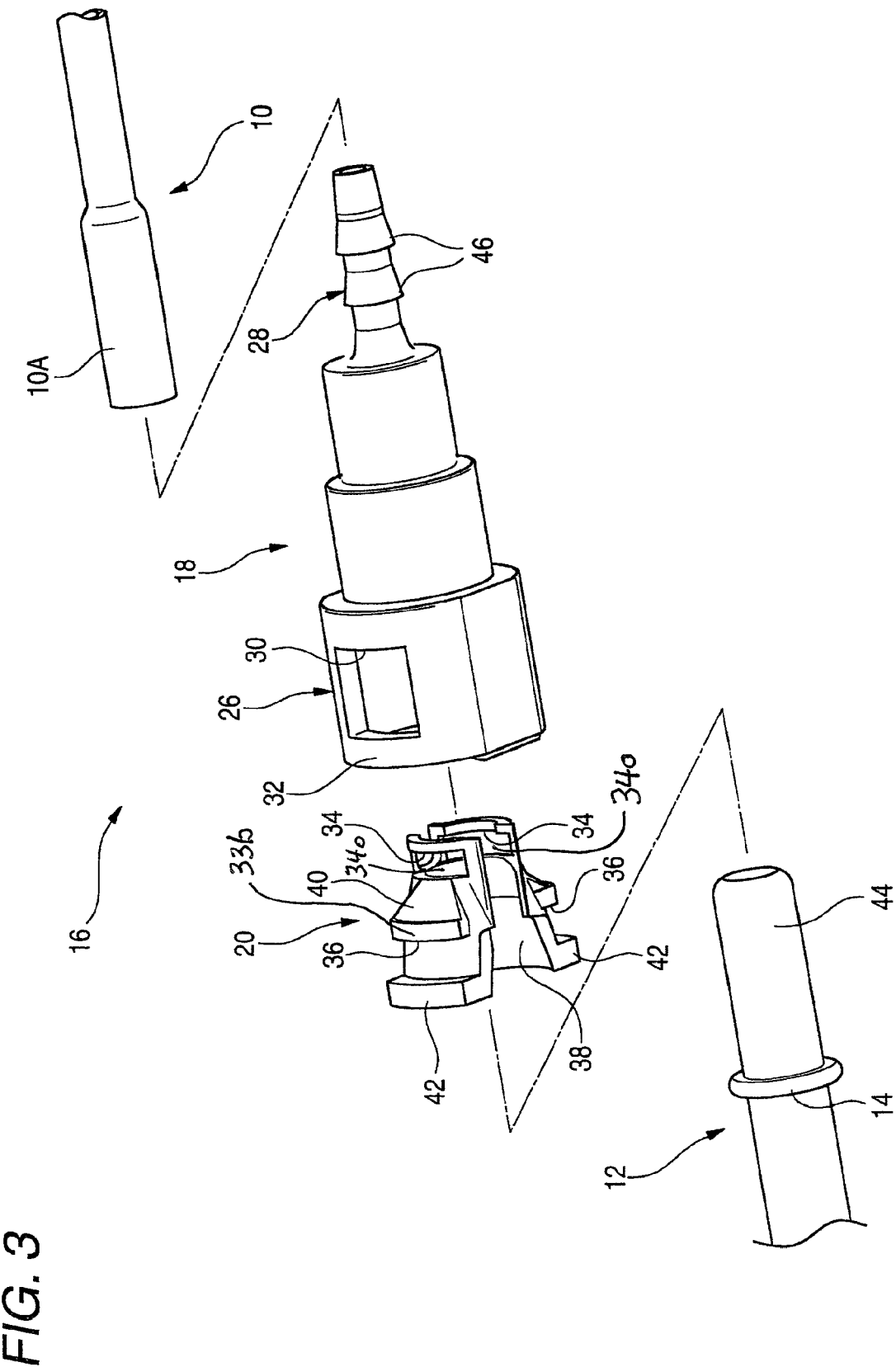
FIG. 3 is a view showing the quick connector of the above embodiment disassembled into the connector body and the retainer, and also showing the mating pipe in a condition before the connection and a resin tube in a condition before the press-fitting.
Figure 4:
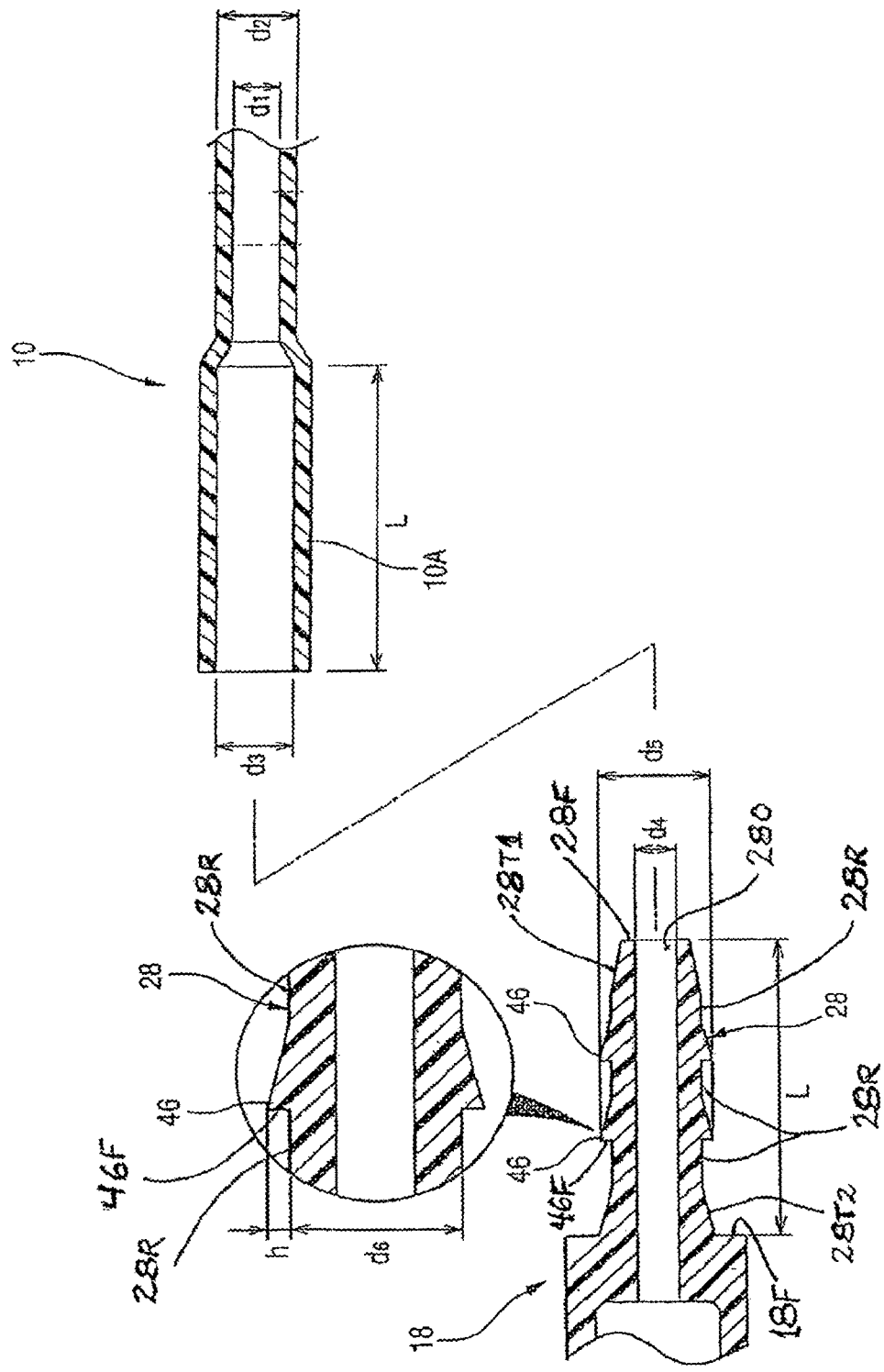
FIG. 4 is a view showing a press-fitting portion of the connector body and the resin tube of the above embodiment, showing a condition before they are press-fitted together.

As shown in FIGS. 3 and 4, the end portion of the resin tube 10, that is, a press-fit undergoing portion 10A thereof into which the press-fitting portion 28 of the connector body 18 is to be press-fitted, is beforehand expanded in tube diameter prior to the press-fitting.

The press-fitting portion 28 is press-fitted into the press-fit undergoing portion 10A of the expanded tube-shape in the axial direction, and by this press-fitting operation, the resin tube 10 and the connector body 18 are combined in an integrated manner in a withdrawal-preventing condition.

In this condition, the resin tube 10 is connected to the mating pipe 12 through the quick connector 16.

The press-fitting portion 28 includes a length L extending rearwardly from an opening 28O at a ring-shaped end face 28F on tip end of the press-fitting portion 28, a ring-shaped end face 18F of the connector body 18. As can be seen in FIG. 4, the press-fitting portion 28 is provided along the length L with the following portions, one immediately after another: a first truncated-conical-shaped portion 28T1 extending from the ring-shaped end face 28F; a cylindrical-shaped root portion 28R, the plurality of truncated-conical-shaped annular projections 46, 46 each followed by a ring-shaped face 46F and another cylindrical-shaped root portion 28R, a second truncated-conical-shaped portion 28T2, which ends abutting with the ring-shaped end face 18F of the connector body 18. In this embodiment, an inner diameter d4 of the press-fitting portion 28 is 2.0 mm, and an outer diameter d5 of each annular projection 46 is 4.5 mm, and an outer diameter d6 of each root portion adjacent to the annular projections 46 is 3.5 mm.

Each of the truncated-conical-shaped annular portions 46 has a projecting ring-shaped face 46F extending orthogonally to length L of the press-fitting portion 28. A height h of projecting ring-shaped face 46F of the annular projection 46 is 0.5 mm.

On the other hand, an inner diameter d3 of the press-fit undergoing portion 10A of the resin tube 10 is 3.5 mm.

Namely, in this embodiment, the outer diameter d6 of the root portion 28R of the press-fitting portion 28 between the truncated-conical-shaped annular projections 46 and 46 is the same as the inner diameter d3 of the press-fit undergoing portion 10A of the expanded tube-shape.

Here, an axial length L of the press-fitting portion 28 is 14.5 mm. An axial length of the press-fit undergoing portion 10A is also L (14.5 mm).

As a result, in this embodiment, the press-fitting portion 28 is press-fitted into the press-fit undergoing portion 10A of the resin tube 10, while radially outwardly bulging and deforming the press-fit undergoing portion 10A by an amount corresponding to the projecting height h of the annular projection 46, and after the press-fitting, the annular projections 46 are kept in a biting condition relative to an inner surface of the bulgingly-deformed press-fit undergoing portion 10A, thereby preventing the withdrawal of the resin tube 10.

As described above, in this embodiment, the end portion of the resin tube 10, having the inner diameter smaller than the outer diameter d6 of the root portion of the press-fitting portion 28, is expanded in tube diameter to form the press-fit undergoing portion 10A having the inner diameter which is the same as the outer diameter d6 of the root portion, and is smaller than the outer diameter d5 of the annular projection 46.

Figure 5A:
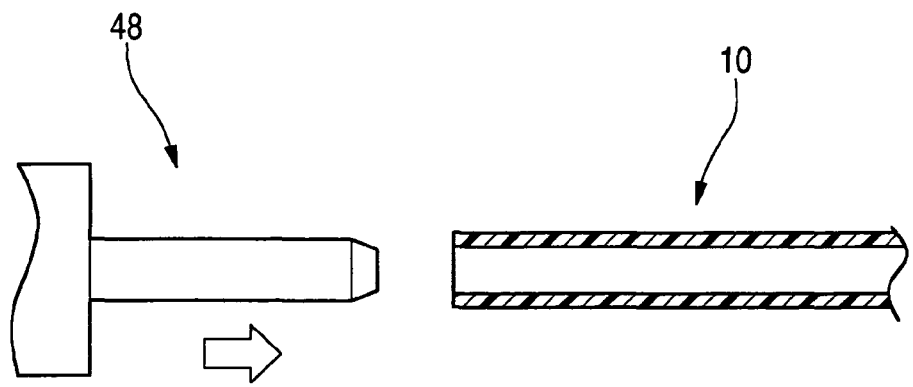
FIGS. 5A, 5B and 5C are views showing a method of forming a press-fit undergoing portion of the resin tube of the above embodiment.
Figure 5B:
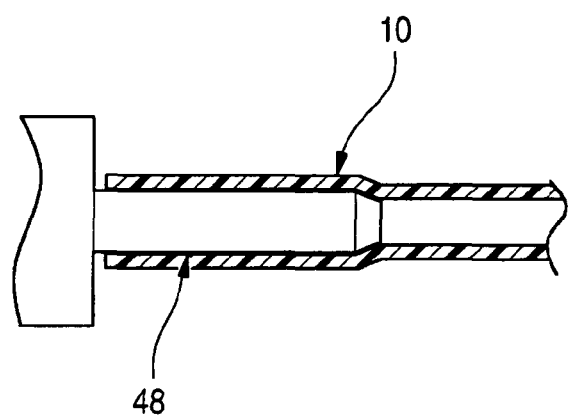
Figure 5C:
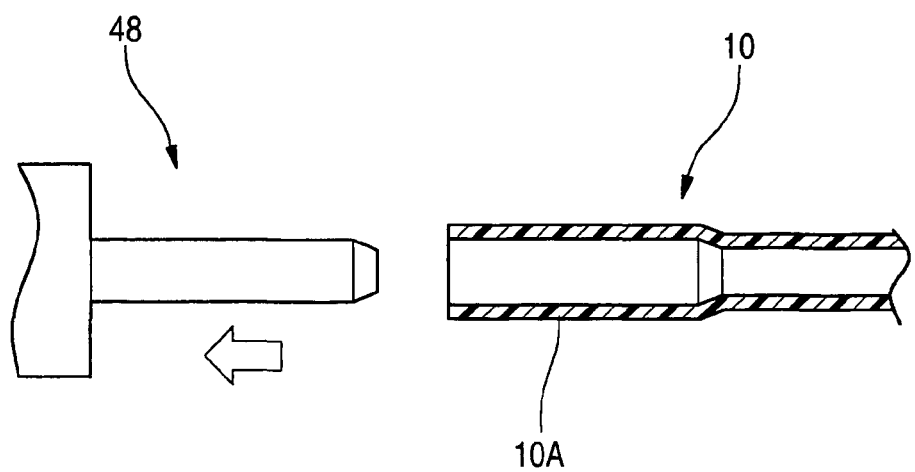

FIGS. 5A to 5C show one example of a method of expanding the end portion of the resin tube 10 to form the press-fit undergoing portion 10A.

As illustrated, here, a beforehand-heated diameter-enlarging pin 48, having a shape corresponding to the shape of the inner surface of the press-fit undergoing portion 10A, is inserted into the end portion of the resin tube 10 in the axial direction.

Namely, the diameter-enlarging pin 48 is inserted into the interior of the resin tube 10 while softening the end portion of the resin tube 10 by heat stored in the diameter-enlarging pin 48 and enlarging the diameter of this end portion.

Thereafter, by withdrawing the diameter-enlarging pin 48 from the resin tube 10, the press-fit undergoing portion 10A of the expanded tube-shape can be formed at the end portion of the resin tube 10.

However, this is merely one example, and various other methods can be used.

As is clear from the foregoing, the quick connector 16 of this embodiment is of the type equipped with the resin tube 10, in which the resin tube 10 is beforehand integrated therewith in a withdrawal-preventing condition. At the time of connecting this resin tube 10 to the mating pipe 12, the resin tube 10 can be easily connected to the mating pipe 12 with the one-touch operation merely by inserting the mating pipe 12 into the interior of the quick connector 16 even if the resin tube 10 has the small diameter as in this embodiment.

Figure 6A:
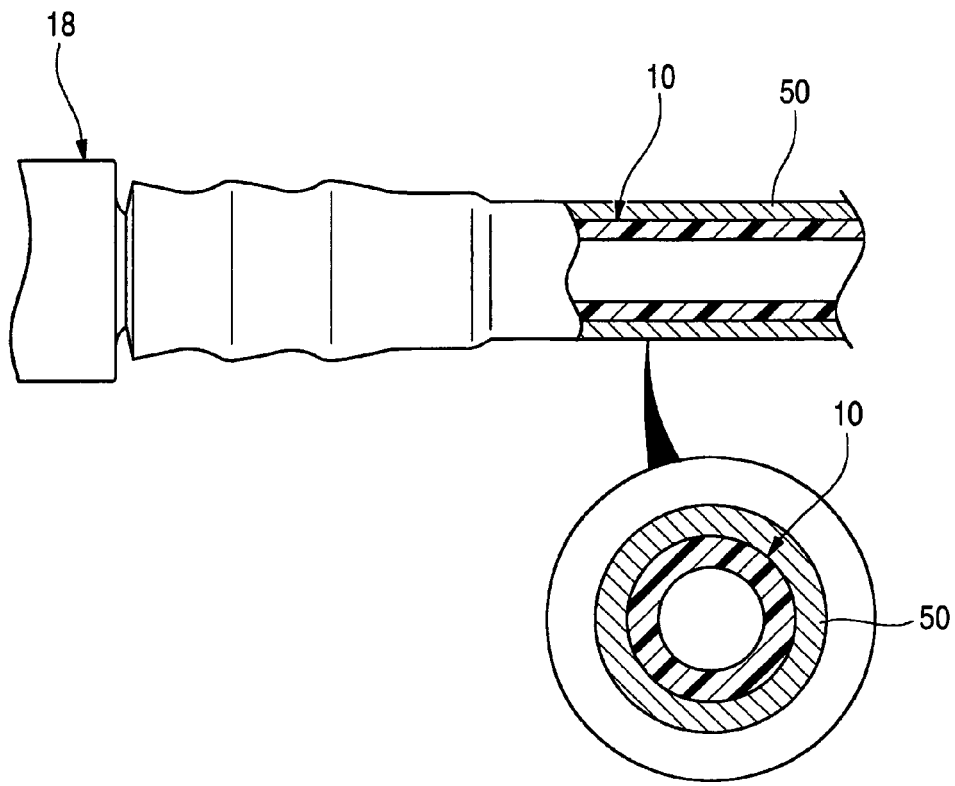
FIGS. 6A and 6B are views showing other embodiments of the present invention, respectively.
Figure 6B:
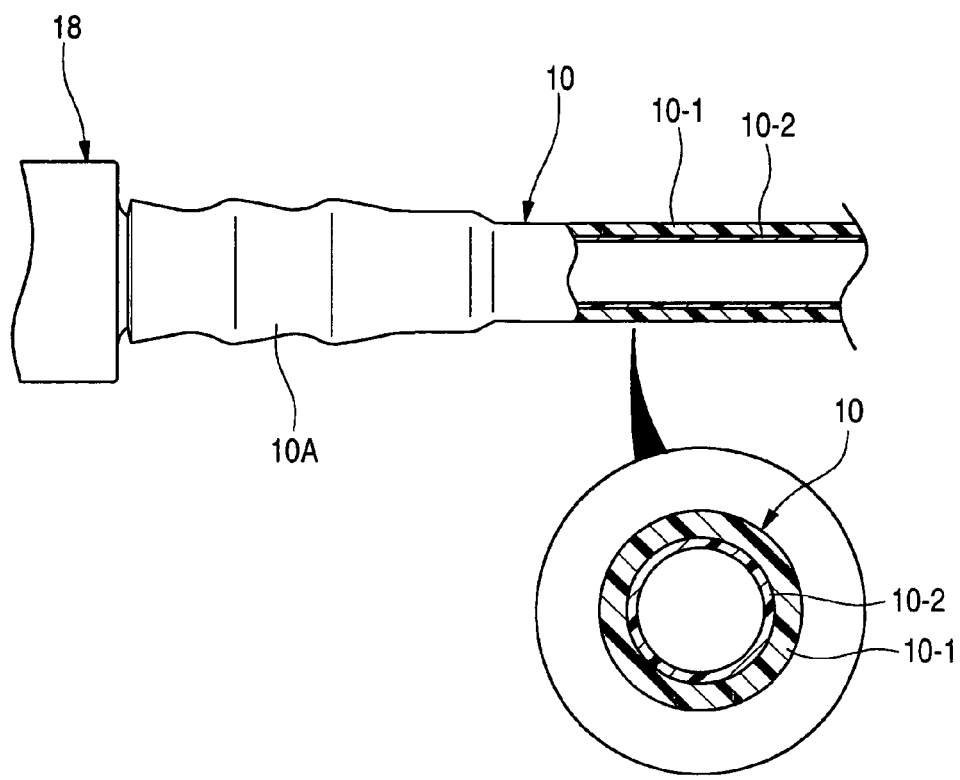

Next, FIGS. 6A and 6B show other embodiments of the present invention.

FIG. 6A shows an example in which a protector 50 is fitted on a resin tube 10 to cover an outer peripheral surface thereof. A wall thickness of the protector 50 is, for example, about 0.5 mm to about 1.0 mm.

In this embodiment, chipping due to a flying stone can be prevented, and also the resin tube 10 can be prevented from being damaged when the resin tube 10 is fixed to a predetermined portion of a vehicle body by a clamp.

EPDM or a thermoplastic resin such as TPE can be used as the protector 50.

Here, EPDM is advantageous in that it is inexpensive, and is excellent in weather resistance.

On the other hand, the thermoplastic resin does not need curing after it is extruded as a protector material, and therefore it is excellent in productivity.

Theses are given merely as one example, and other materials can, of course, be used.

FIG. 6B shows the further embodiment.

In this embodiment, a resin tube 10 is formed into a two-layer layered structure having an outer layer 10-1 and an inner layer 10-2.

Here, the above-mentioned materials such as polyamide can be used for the outer layer 10-1.

On the other hand, a resin with an excellent sour gasoline resistance, such as ETFE, is used to form the inner layer 10-2.

Here, sour gasoline is gasoline whose sulfur content is increased by oxidation, and it exerts adverse effects such as the corrosion of metal parts and the deterioration of the resin tube.

Therefore, in this embodiment, the resin tube 10 has the two-layer layered structure, and the outer layer 10-1 is composed of polyamide or the like having a pressure-withstanding strength, while the inner layer 10-2 is composed of a material more excellent in gasoline resistance (particularly sour gasoline resistance) than the outer layer 10-1. Therefore, the strength of the resin tube 10 itself can be increased to a high strength by the outer layer 10-1 while preventing the deterioration of the resin tube 10 due to sour gasoline or the like.

Figure 7:
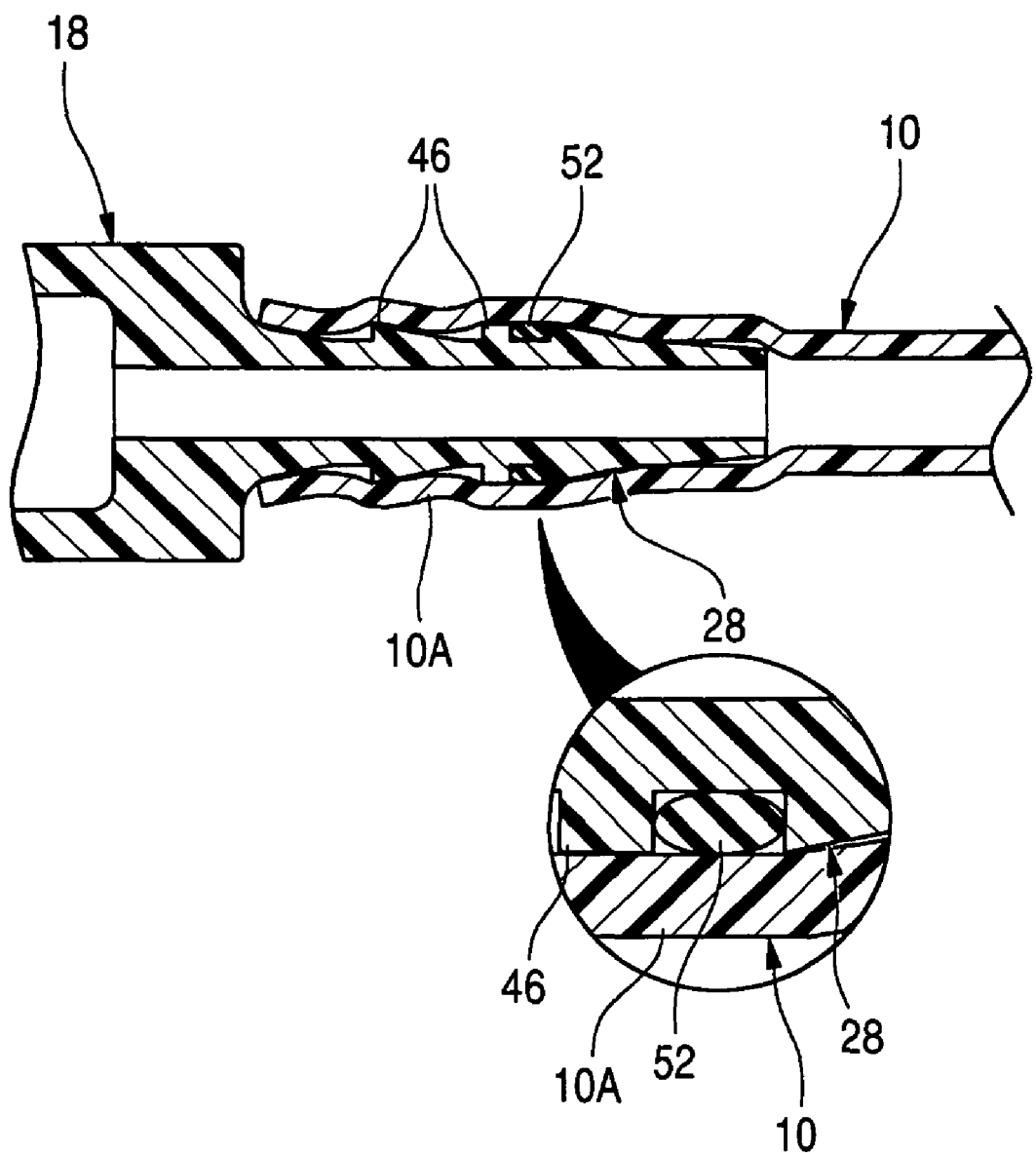
FIG. 7 is a view showing a further embodiment of the present invention.
Figures 8A, 8B:
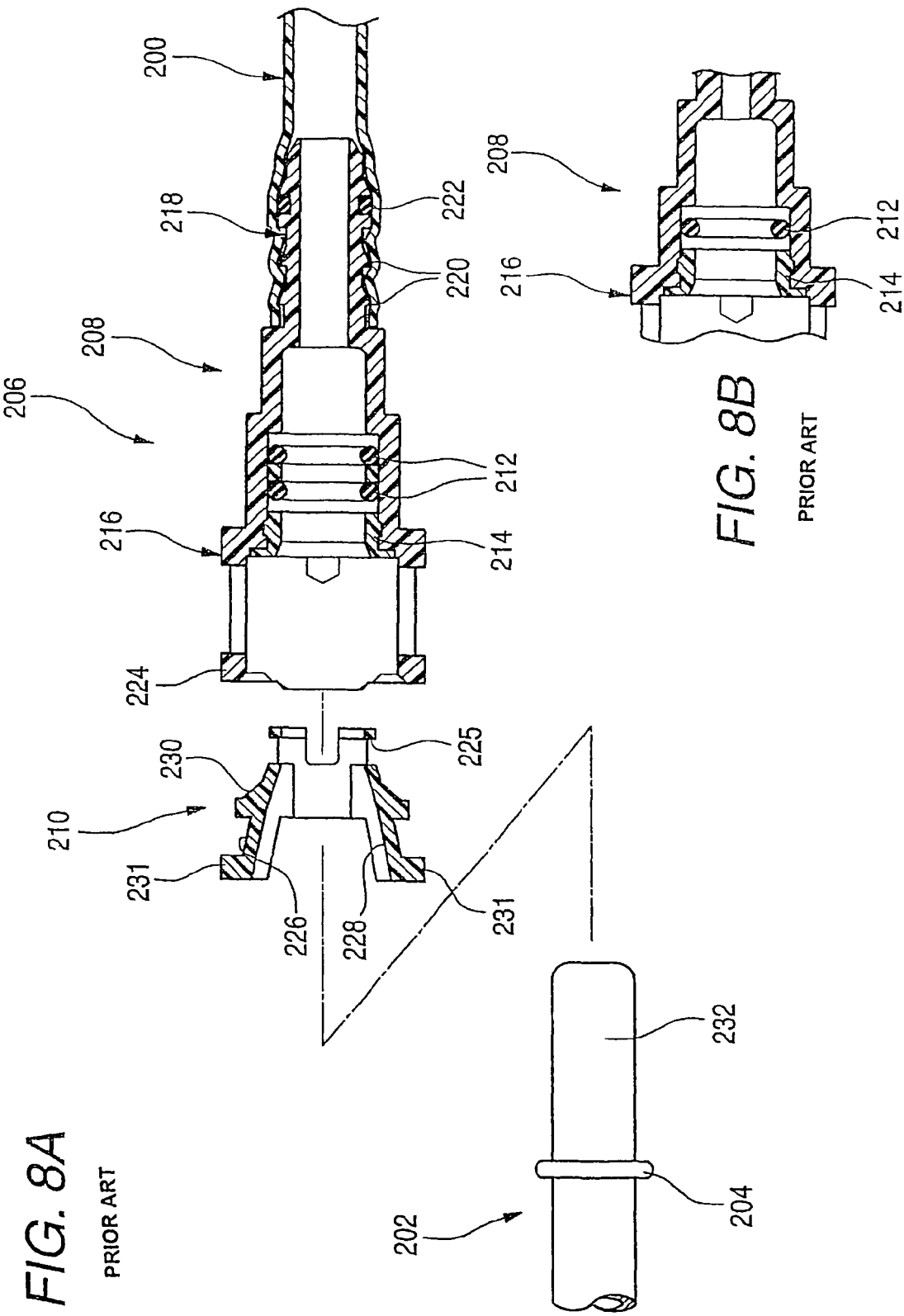
FIGS. 8A and 8B are views showing one example of a conventional quick connector which is press-fitted in a resin tube, but is not yet connected to a mating pipe.
Figure 9A:
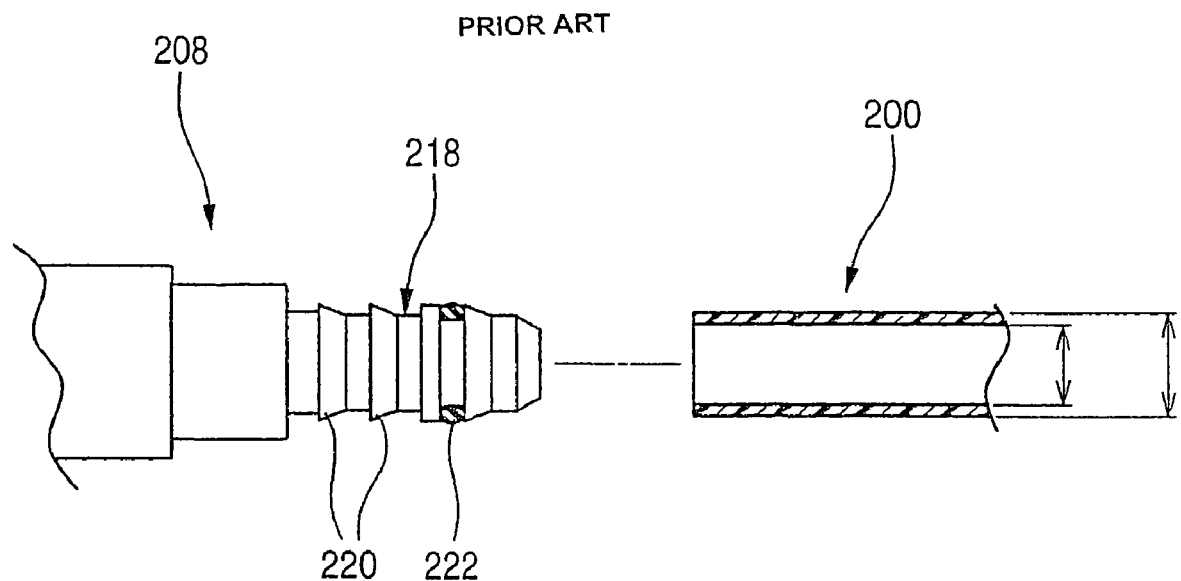
FIGS. 9A and 9B are views showing important portions of the quick connector of FIGS. 8A and 8B.
Figure 9B:
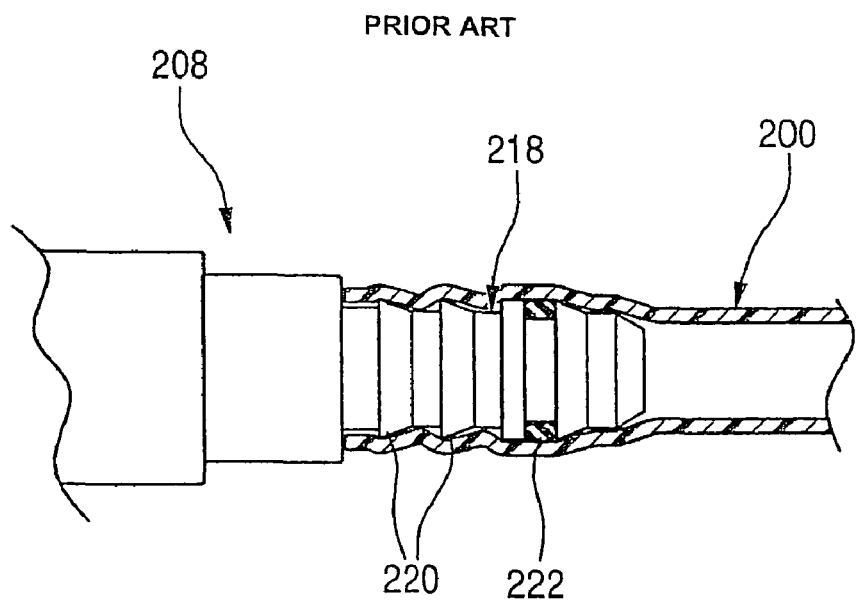
Figure 10:
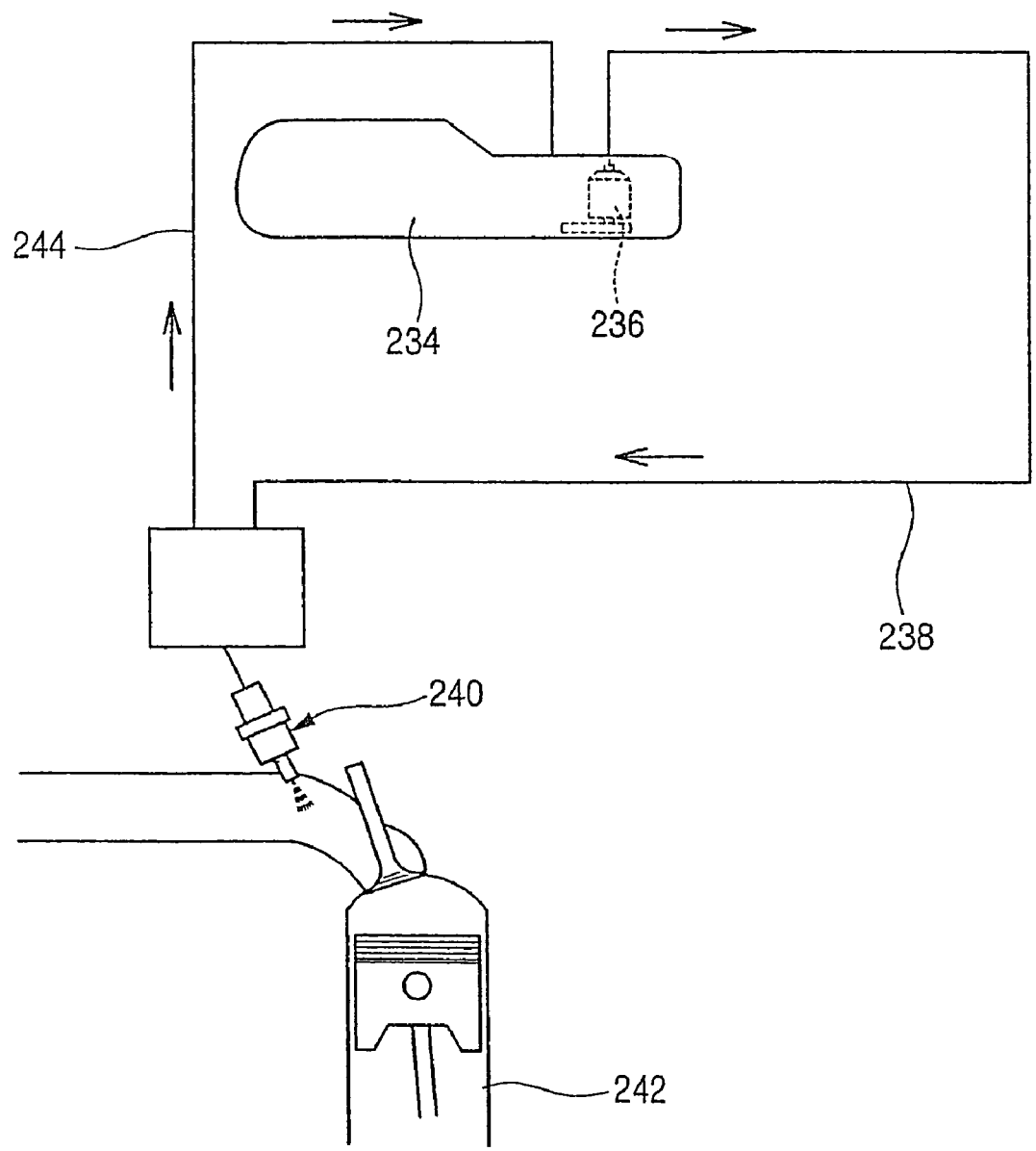
FIG. 10 is a conceptual view of a fuel return system.

FIG. 7 shows a still further embodiment of the present invention.

In the above embodiments, the withdrawal prevention and the sealing are both effected merely by press-fitting the press-fitting portion 28 with the annular projections 46 into the press-fit undergoing portion 10A of the resin tube 10. In the embodiment of FIG. 7, however, an annular groove is formed in a press-fitting portion 28, and an O-ring 52 serving as a seal member is mounted in this groove, and the ability of sealing between the press-fitting portion 28 and the press-fit undergoing portion 10A is enhanced by this O-ring 52.

The embodiments of the present invention have been described above in detail, but these are merely illustrated by way of examples, and in the present invention, the quick connector 16, including the above retainer 20 and retainer holding portion 26, can be constructed in various forms, and also the shape and dimensions of the press-fitting portion 28 of the connector body 18 and the shape and dimensions of the press-fit undergoing portion 10A of the resin tube 10 can be changed to various other shapes and dimensions than those of the above examples, and thus the present invention can be constructed in forms with various changes without departing from the spirit of the present invention.

The invention claimed is:
1. A resin tube-equipped quick connector for connecting a fuel-transporting resin tube to a mating pipe, comprising a connector body, a C-shaped retainer and a seal member;
  wherein the connector body has a generally tubular shape as a whole, has a retainer holding portion adapted to receive and hold the C-shaped retainer in an axial opening at one axial end thereof, and also has at an opposite axial end thereof, a press-fitting portion which is press-fitted into the interior of the resin tube from one end thereof,
  wherein an exterior of the press-fitting portion consists of the following portions along an axial length (L) thereof, one immediately after another:
  a first truncated-conical-shaped portion extending from a ring-shaped end face on a tip end of the press-fitting portion;
  a first cylindrical-shaped root portion,
  a first truncated-conical-shaped annular projection followed by a first ring-shaped face and a second cylindrical-shaped root portion,
  a second truncated-conical-shaped annular projection followed by a second ring-shaped face and a third cylindrical-shaped root portion,
  a second truncated-conical-shaped portion, which ends abutting with a flat ring-shaped end face of the connector body,
  wherein the resin tube includes a press-fit undergoing portion into which the press-fitting portion is press-fitted, wherein the press-fit undergoing portion of the resin tube into which the press-fitting portion is press-fitted has an internal diameter (d3) substantially equal to 3.5 mm, and a portion of the resin tube into which the press-fitting portion is not press-fitted has an internal diameter (d1) substantially equal to 2.5 mm, and wherein a ratio of the axial length (L) of the press-fitting portion to an inner diameter (d4) of the press-fitting portion is substantially equal 7.25 to 1.0.

2. The resin tube-equipped quick connector as claimed in claim 1, wherein the retainer holding portion includes first and second windows opening through opposite curved sides thereof, wherein the C-shaped retainer includes a first arc-shaped portion which projects outwardly into the first window of the retainer holding portion, and a second arc-shaped portion which projects outwardly into the second window of the retainer holding portion, wherein the C-shaped retainer includes a retainer-side engagement portion having first and second arc-shaped windows which open on opposite sides thereof in a radial direction, which are adapted to engage with a convex pipe-side engagement portion from a radially-inward side, formed on an outer peripheral surface of the mating pipe and spaced from an axial insertion-side end thereof, so as to fix the inserted mating pipe in the axial direction; and when the mating pipe is fixed in an axial direction in the C-shaped retainer, and the C-shaped retainer is held in the connector body, the convex engagement portion of the mating pipe is visible when viewed through each of the first and second windows of the retainer holding portion, wherein the seal member is mounted within the connector body at an inner region thereof disposed closer to the press-fitting portion than the retainer holding portion is disposed, and the seal member is brought into contact with an outer peripheral surface of an insertion end portion of the inserted mating pipe disposed closer to a distal end of the mating pipe than the pipe-side engagement portion is disposed, thereby forming an air-tight seal between the insertion end portion and an inner surface of the connector body, and wherein the retainer is elastically deformable radially, a retainer-side retaining engagement portion is capable of being fitted to a body-side retaining engagement portion, formed at the retainer holding portion of the connector body, from a radially-inward side to be retained and fixed in the axial direction, the retainer also including:
at least one of an inner peripheral cam surface for elastically expanding the retainer when inserting the mating pipe into the retainer and an outer peripheral cam surface for elastically reducing the diameter of the retainer when inserting the retainer into the retainer holding portion.

3. The resin tube-equipped quick connector as claimed in claim 1 or 2, wherein a protector is fitted on the resin tube to cover an outer peripheral surface of the resin tube.

4. The resin tube-equipped quick connector as claimed in claim 1 or 2, wherein the resin tube has a multi-layer structure an inner layer of the resin tube is more excellent in gasoline resistance than an outer layer.

5. The resin tube-equipped quick connector as claimed in claim 1, wherein the resin tube includes an inner diameter of not larger than 5 mm.

6. The resin tube-equipped quick connector as claimed in claim 1,
wherein the axial length (L) of the press-fitting portion is about 14.5 mm, and the inner diameter (d4) of the press-fitting portion is about 2.0 mm, and thus the ratio of the axial length (L) of the press-fitting portion to the inner diameter (d4) of the press-fitting portion is about equal to 7.25 to 1.0.

7. The resin tube-equipped quick connector as claimed in claim 6, wherein
the first truncated-conical-shaped annular projection is closer to a distal end of the press-fitting portion than the second truncated-conical-shaped annular projection.

8. The resin tube-equipped quick connector as claimed in claim 6, no portion of the press-fitting portion has an outer diameter larger than an outer diameter (d5) of each of the truncated-conical-shaped shaped annular projections.

9. The resin tube-equipped quick connector as claimed in claim 1, further comprising a bushing mounted within the connector body at a region deeper than the retainer holding portion.

10. The resin tube-equipped quick connector as claimed in claim 1, wherein before the press-fitting portion is press-fitted into the press-fit undergoing portion, the press-fit undergoing portion is formed with an inner diameter that is substantially equal to an outer diameter (d6) of the root portions of the press-fitting portion, and after the press-fitting portion is press-fitted into the press-fit undergoing portion of the resin tube, the press-fit undergoing portion is adapted to cause portions of its inner diameter (d3) facing the root portions to become equal to the outer diameter (d6) of the root portions, so that and the press-fit undergoing portion is integrated with the press-fitting portion in a withdrawal-preventing condition.

11. A resin tube-equipped quick connector for connecting a fuel-transporting resin tube to a mating pipe, comprising:
a connector body, a C-shaped retainer and a seal member;
wherein the connector body has a generally tubular shape as a whole, and has a retainer holding portion adapted to receive and hold the C-shaped retainer in an axial opening at one axial end thereof, and also has at an other axial end thereof, a press-fitting portion which is press-fitted into the interior of the resin tube from one end thereof;
wherein an exterior of the press-fitting portion consists of the following portions along an axial length (L) thereof, one immediately after another:
a first truncated-conical-shaped portion extending from a ring-shaped end face on a tip end of the press-fitting portion;
a first cylindrical-shaped root portion,
a first truncated-conical-shaped annular projection followed by a first ring-shaped face and a second cylindrical-shaped root portion,
a second truncated-conical-shaped annular projection followed by a second ring-shaped face and a third cylindrical-shaped root portion,
a second truncated-conical-shaped portion, which ends abutting with a flat ring-shaped end face of the connector body,
wherein the retainer holding portion includes first and second box-shaped windows opening through opposite curved sides thereof;
a press-fit undergoing portion of the resin tube, into which the press-fitting portion is to be press-fitted, has an inner diameter that is expanded prior to press-fitting, and the press-fit undergoing portion is press-fitted in the tube diameter-expanded press-fit undergoing portion to be integrated therewith in a withdrawal-preventing condition, wherein the press-fit undergoing portion of the resin tube into which the press-fitting portion is press-fitted has an internal diameter (d3) substantially equal to 3.5 mm, and a portion of the resin tube into which the press-fitting portion is not press-fitted has an internal diameter (d1) substantially equal to 2.5 mm, and a ratio of the axial length (L) of the press-fitting portion to an inner diameter (d4) of the press-fitting portion is substantially equal 7.25 to 1.0.

12. The resin tube-equipped quick connector as claimed in claim 11, wherein the C-shaped retainer includes a first arc-shaped portion which projects outwardly into the first box-shaped window of the retainer holding portion, and a second arc-shaped portion which projects outwardly into the second box shaped window of the retainer holding portion, wherein the C-shaped retainer includes a retainer-side engagement portion having first and second arc-shaped windows which open on opposite sides thereof in a radial direction, which are adapted to engage with a convex pipe-side engagement portion from a radially-inward side, formed on an outer peripheral surface of the mating pipe and spaced from an axial insertion-side end thereof, so as to fix the inserted mating pipe in the axial direction; and when the mating pipe is fixed in an axial direction in the C-shaped retainer, and the C-shaped retainer is held in the connector body, the convex engagement portion of the mating pipe is visible when viewed through each of the first and second windows of the retainer holding portion, the seal member is mounted within the connector body at an inner region thereof disposed closer to the press-fitting portion than the retainer holding portion is disposed, and the seal member is brought into contact with an outer peripheral surface of an insertion end portion of the inserted mating pipe disposed closer to a distal end of the mating pipe than the pipe-side engagement portion is disposed, thereby forming an air-tight seal between the insertion end portion and an inner surface of the connector body.

13. The resin tube-equipped quick connector as claimed in claim 11, wherein the axial length (L) of the press-fitting portion is about 14.5 mm, and the inner diameter (d4) of the press-fitting portion is about 2.0 mm, and thus the ratio of the axial length (L) of the press-fitting portion to the inner diameter (d4) of the press-fitting portion is about equal to 7.25 to 1.0.

14. The resin tube-equipped quick connector as claimed in claim 13, no portion of the press-fitting portion has an outer diameter larger than an outer diameter (d5) of each of the truncated-conical-shaped shaped annular projections.

15. A coupling structure of a quick connector and a resin tube for connecting a fuel-transporting resin tube to a mating pipe, comprising: a connector body, a retainer, and
a seal member;
wherein the connector body has a generally tubular shape as a whole, and has a retainer holding portion at one axial side thereof, and also has at the other side thereof a press-fitting portion which is press-fitted into the interior of the resin tube from one end thereof, wherein an exterior of the press-fitting portion consists of the following portions along an axial length (L) thereof, one immediately after another:

a first truncated-conical-shaped portion extending from a ring-shaped end face on a tip end of the press-fitting portion;

a first cylindrical-shaped root portion, a first truncated-conical-shaped annular projection followed by a first ring-shaped face and a second cylindrical-shaped root projection, a second truncated-conical-shaped annular projection followed by a second ring-shaped face and a third cylindrical-shaped root portion, a second truncated-conical-shaped portion, which ends abutting with a flat ring-shaped end face of the connector body, wherein the retainer holding portion includes first and second windows opening through opposite curved sides thereof, wherein the retainer is a member adapted to be held in the retainer holding portion, and includes:

a first arc-shaped portion which projects outwardly into the first window of the retainer holding portion, and a second arc-shaped portion which projects outwardly into the second window of the retainer holding portion, and a retainer-side engagement portion having first and second arc-shaped windows which open on opposite sides thereof in a radial direction, which are adapted to engage with a convex pipe-side engagement portion from a radially-inward side, formed on an outer peripheral surface of the mating pipe and spaced from an axial insertion-side end thereof, so as to fix the inserted mating pipe in the axial direction; and when the mating pipe is fixed in an axial direction in the retainer, and the retainer is held in the connector body, the first and second arc-shaped recesses engaging the convex pipe-side engagement portion of the mating pipe are located under each of the first and second windows of the retainer holding portion, wherein the seal member is mounted within the connector body at an inner region thereof disposed closer to the press-fitting portion than the retainer holding portion is disposed, and the seal member is brought into contact with an outer peripheral surface of an insertion end portion of the inserted mating pipe disposed closer to a distal end of the mating pipe than the pipe-side engagement portion is disposed, thereby forming an air-tight seal between the insertion end portion and an inner surface of the connector body; and wherein the resin tube is a small-diameter tube having an inner diameter of not larger than 5 mm, wherein the resin tube includes a press-fit undergoing portion into which the press-fitting portion is press-fitted, wherein the press-fit undergoing portion of the resin tube into which the press-fitting portion is press-fitted has an internal diameter (d3) substantially equal to 3.5 mm, and a portion of the resin tube into which the press-fitting portion is not press-fitted has an internal diameter (d1) substantially equal to 2.5 mm, wherein a ratio of the axial length (L) of the press-fitting portion to an inner diameter (d4) of the press-fitting portion is substantially equal 7.25 to 1.0.

16. The coupling structure of a quick connector and a resin tube as in claim 15, wherein the retainer is elastically deformable radially, and a retainer-side retaining engagement portion is capable of being fitted to a body-side retaining engagement portion, formed at the retainer holding portion of the connector body, from a radially-inward side to be retained and fixed in the axial direction, the retainer also including:
   at least one of an inner peripheral cam surface for elastically expanding the retainer when inserting the mating pipe into the retainer and an outer peripheral cam surface for elastically reducing the diameter of the retainer when inserting the retainer into the retainer holding portion.

17. The coupling structure of a quick connector and a resin tube as in claim 15, further comprising a protector fitted on the resin tube to cover an outer peripheral surface of the resin tube.

18. The coupling structure of a quick connector and a resin tube as in claim 15, wherein the axial length (L) of the press-fitting portion is about 14.5 mm, and the inner diameter (d4) of the press-fitting portion is about 2.0 mm, and thus the ratio of the axial length (L) of the press-fitting portion to the inner diameter (d4) of the press-fitting portion is about equal to 7.25 to 1.0.

19. The coupling structure of a quick connector and a resin tube as in claim 15, wherein the resin tube comprises a polyamide resin.

20. The coupling structure of a quick connector and a resin tube as in claim 15,
   wherein an outer diameter (d6) of a root portion provided between the first and second truncated-conical-shaped annular projections and an inner diameter (d3) of the tube diameter-expanded press-fit undergoing portion are substantially the same, and
   wherein the axial length (L) of the press-fitting portion and an axial length (L) of the press-fitting undergoing portion are substantially the same.

* * * * *